United States Patent [19]
Hasetoh et al.

[11] Patent Number: 5,251,720
[45] Date of Patent: Oct. 12, 1993

[54] STRUCTURE FOR MOUNTING POWERTRAIN OF VEHICLE

[75] Inventors: Sakumi Hasetoh; Osamu Kameda, both of Hiroshima; Junichi Okita, Iwakuni; Ichiro Hirose; Yoshimichi Tanaka, both of Hiroshima; Akie Kondo; Hitoshi Akutagawa, both of Hiroshima, all of Japan

[73] Assignee: Mazda Motor Corporation, Hiroshima, Japan

[21] Appl. No.: 845,929

[22] Filed: Mar. 5, 1992

[30] Foreign Application Priority Data

Mar. 8, 1991 [JP] Japan ................... 3-043259
Mar. 25, 1991 [JP] Japan ................... 3-060514

[51] Int. Cl.⁵ .................................. B60K 5/04
[52] U.S. Cl. ........................ 180/297; 180/312
[58] Field of Search ............ 180/297, 312, 299, 300, 180/309, 79.3, 234; 60/302

[56] References Cited

U.S. PATENT DOCUMENTS 5,050,701 9/1991 Okai et al. .................. 180/309
5,129,476 7/1992 Kikuchi et al. ............. 180/309
5,133,427 7/1992 Arvidsson et al. .......... 180/297

FOREIGN PATENT DOCUMENTS 61-74620  5/1986 Japan .
63-103735 5/1988 Japan .
1-226429  9/1989 Japan .
1-301410 12/1989 Japan .
1-316560 12/1989 Japan .

Primary Examiner—Richard M. Camby
Attorney, Agent, or Firm—Keck, Mahin & Cate

[57] ABSTRACT

A powertrain includes an engine and a transmission and has a center inertial axis extending in a transverse direction of the vehicle body. The powertrain is mounted on the vehicle body for inertial movement about the center inertial axis by a pair of elastic mountings, disposed on opposite sides of the powertrain and not below the inertial axis. Another elastic mounting is disposed behind the powertrain. An exhaust pipe assembly, extending rearwardly and down behind the powertrain from the engine, is flexibly supported by a retainer connected, either directly or through the other elastic mounting, to the powertrain.

16 Claims, 7 Drawing Sheets

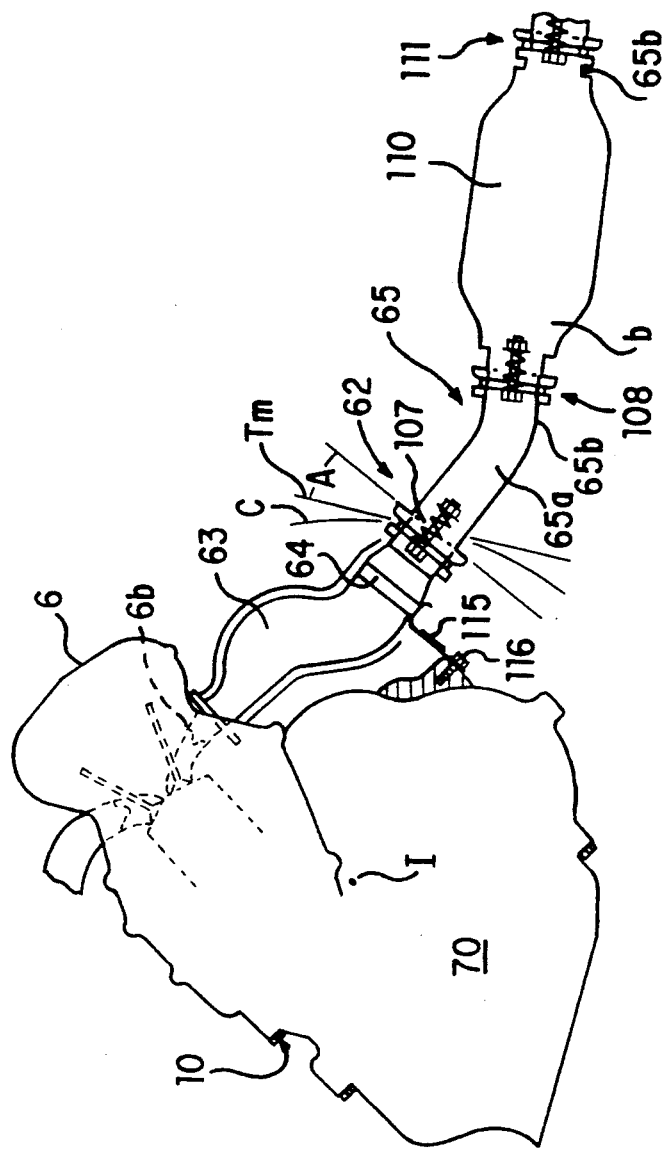
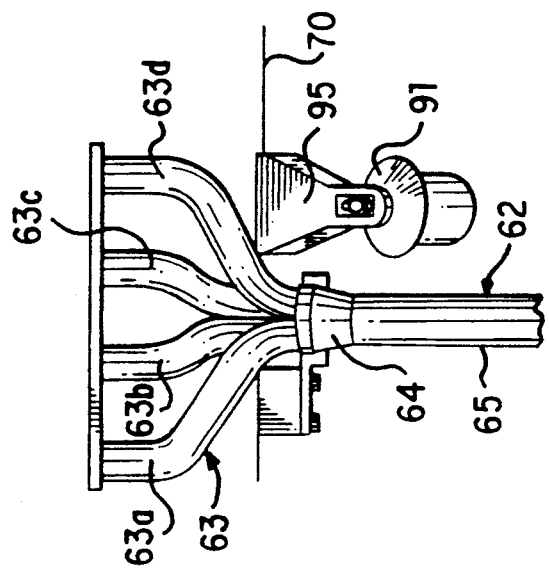
FIG. 7
FIG. 6

STRUCTURE FOR MOUNTING POWERTRAIN OF VEHICLE

BACKGROUND OF THE INVENTION

FIELD OF THE INVENTION

This invention relates to a structure for mounting a powertrain, including at least an engine and a transmission, as one unit on a vehicle body.

In automotive vehicles, such as four wheel drive vehicles and front engine, front drive vehicles, a powertrain, including at least an engine and a transmission, is typically located in an engine room of the vehicle body. Various powertrain layouts are designed, depending on how a transmission and an engine are mounted in the engine room. The particular layout selected most greatly depends on whether the transmission has its input and output axes aligned in a lengthwise direction of the vehicle body or a transverse direction of the vehicle body. If both the engine and the transmission are disposed in series in the transverse direction of the vehicle body, the engine and the transmission, as a single powertrain unit, occupy a large percentage of the engine room in the transverse direction.

DESCRIPTION OF THE RELATED ART

In order to compactly arrange the powertrain in the engine room, it is common to orient both the engine and the transmission in the transverse direction and side by side in the lengthwise direction of the vehicle body. It is also common to orient the engine and the transmission so that they are parallel in the transverse direction of the vehicle body and operationally coupled by a power transmission means such as a gear train or a chain. Such transversely oriented, parallel powertrain arrangements are known from, for instance, Japanese patent application No. 61-249,204, entitled "Power Transmission Mechanism," published as Japanese Unexamined Patent Publication No.63-103,735 on May 9, 1988, and Japanese patent application No. 63-146,128, entitled "Power Transmission Mechanism," published as Japanese Unexamined Patent Publication 1-316,560 on Dec. 21, 1989.

Such a transverse powertrain, in which an engine and a transmission are placed in a transverse direction of the vehicle body and arranged parallel to each other in an engine room, is mounted in an engine room for "inertial rolling." Such inertial rolling necessitates versatile movement about a center axis of inertia of the powertrain. This movement is permitted by flexible mounting structures which typically include a pair of, or left and right, elastic mounting means, separately located on opposite, or left and right, sides of the powertrain and aligned with the center axis of inertia of the powertrain. The center axis of inertia extends parallel to a crankshaft of the engine, i.e., in the transverse direction of the vehicle body. The pair of elastic mounting means supports the powertrain so as to allow inertial rolling movement of the powertrain about the center axis of inertia. A retainer means, disposed behind the powertrain, restricts or controls inertial rolling movement of the powertrain about the center axis of inertia.

One type of such flexible mounting structures is known from, for instance, Japanese Unexamined Patent Publication No. 1-226,429. However, when arranging or laying out supplemental apparatuses, such as a lubrication oil pump, an engine cooling water pump, an air conditioning compressor pump, and the like, so that they cooperate with the engine of the powertrain, it is difficult to align the elastic mounting means with the center axis of inertia of the powertrain.

In addition, despite the need for an increased vehicle body structural strength in the location of the transmission, due to the fact that reaction forces developed on axles, extending in the transverse direction and passing through the transmission, are transmitted to the vehicle body through the powertrain, there has so far been no consideration concerning the need to increase the vehicle body structural strength. The flexible mounting structures should be constructed so as to prevent the occurrence of extraordinary noises due to exhaust pipe vibrations; such exhaust pipes typically extend from a rear upper portion of the engine and cross over the powertrain towards the rear end of the vehicle body. Such flexible mounting structures are described in, for instance, Japanese Unexamined Patent Publication No. 1-301,410.

Mounting the powertrain on the vehicle body so as to allow it to undergo inertial rolling movement unavoidably leads to providing a flexible exhaust pipe assembly connected to the engine. Such a flexible exhaust pipe assembly, arranged so as to extend from the engine initially rearward and down and then horizontally under a vehicle body towards a rear end of the vehicle, typically includes a pair of flexible joints These joints may be spherical seat joint units for flexibly connecting an upstream pipe portion and a downstream pipe portion so as to prevent the downstream pipe portion from being subjected to vibrations of the powertrain. A flexible exhaust pipe assembly or system of this type is known from, for instance, Japanese utility model application no. 59-160,560, entitled "Exhaust System of Engine for Automobiles," and published as Japanese Unexamined Utility Model Publication No. 61-74,620 on May 20, 1986.

In the exhaust system of this publication, however, since the spherical joints are disposed in the horizontal downstream pipe portion located relatively far away from the engine, both the upstream and downstream pipe portions vibrate. This adversely affects the connection between the engine and the exhaust pipe assembly. Because of this, the connecting portion must have a certain strength to counteract effects of the vibration. Additionally, in a typical exhaust system structure, in which bolts are used to clamp the upstream and downstream exhaust pipe portions, an increased number of parts is required and the cost of the system is increased.

SUMMARY OF THE INVENTION

It is one object of the present invention to provide an improved structure for mounting a transverse powertrain, including at least an engine and a transmission, in an engine room of a vehicle body. The improved structure allows inertial rolling movement of the transverse powertrain and can be used with a wide variety of powertrains.

It is another object of the present invention to provide an improved structure for mounting a transverse powertrain, including at least an engine and a transmission, in an engine room of a vehicle body which reinforces, or increases the structural strength of, part of the vehicle body which is subjected to reaction forces on front axles transmitted through the transmission.

It is a further object of the present invention to provide an improved structure for mounting a powertrain, including at least an engine and a transmission, in an engine room of a vehicle body, by which an exhaust pipe assembly connected to the engine is supported so that it is not adversely affected by inertial rolling movement of the powertrain.

The foregoing objects are accomplished, according to the present invention, by providing a particular powertrain mounting structure for mounting a powertrain, including at least an engine and a transmission constructed as a single unit in which the engine is transversely oriented with its crankshaft extending in a transverse direction of the vehicle body. The engine has an exhaust pipe assembly attached to it and initially extending rearward and down therefrom and then under the vehicle body toward a rear end of the vehicle body. A transmission is transversely placed adjacent to and behind the engine with its input and output shafts oriented parallel to the crankshaft of the engine. The powertrain is mounted by the improved mounting structure in an engine room of a vehicle body, and is flexibly supported for inertial rolling movement by mounting means. The mounting means includes a pair of trunnion mounts fixedly secured to the vehicle body and aligned along a transverse line not lower than a center axis of inertia of the single unit powertrain; this center axis is parallel to the center axis of rotation of the crankshaft. The trunnion mounts support the powertrain laterally and on opposite sides of the powertrain. The powertrain is further flexibly supported from its back by a retainer means fixed to the vehicle body so that its inertial rolling movement is restricted or controlled The retainer means, on the other hand, supports the portion of the exhaust pipe assembly extending rearwardly and down. A cross member, extending in the transverse direction adjacent a rear portion of the powertrain at which the transmission is provided and secured to the vehicle body, fixedly mounts thereon the retaining means. As a result, the vehicle body is reinforced sufficiently in the vicinity of the transmission against vibrations transmitted through the transmission.

The exhaust pipe assembly, connected to the engine and supported by a supporting member connected, directly or through the retaining means, to the powertrain, includes an upstream exhaust pipe extending, from the engine, rearwardly and down and a downstream exhaust pipe extending, from the upstream pipe, initially rearwardly and down and then under the vehicle body towards the rear end of the vehicle body. The upstream and downstream exhaust pipes are connected by a flexible joint means, such as a spherical seat joint, so that the exhaust assembly has a sufficient flexibility to permit inertial rolling movement of the powertrain.

BRIEF DESCRIPTION OF THE DRAWINGS

The above and other objects and features of the present invention will be apparent to those skilled in the art from the following description of preferred embodiments thereof when considered in conjunction with the appended drawings, in which similar reference numerals have been used to designate the same or similar elements and in which:

FIG. 6 is a detailed illustration showing the retaining means of the powertrain mounting structure of FIG. 5 as viewed in the direction of arrow B shown in FIG. 5;

FIG. 7 is an illustration of an exhaust pipe assembly used with the powertrain of FIG. 1;

DETAILED DESCRIPTION OF THE PREFERRED EMBODIMENTS

Figure 1A:
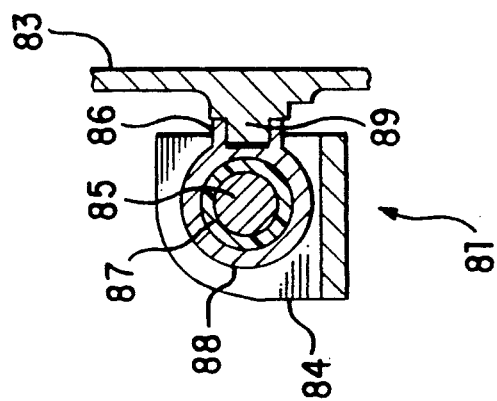
FIG. 1A is a cross-sectional view showing mounting means for a powertrain.
Figure 1:
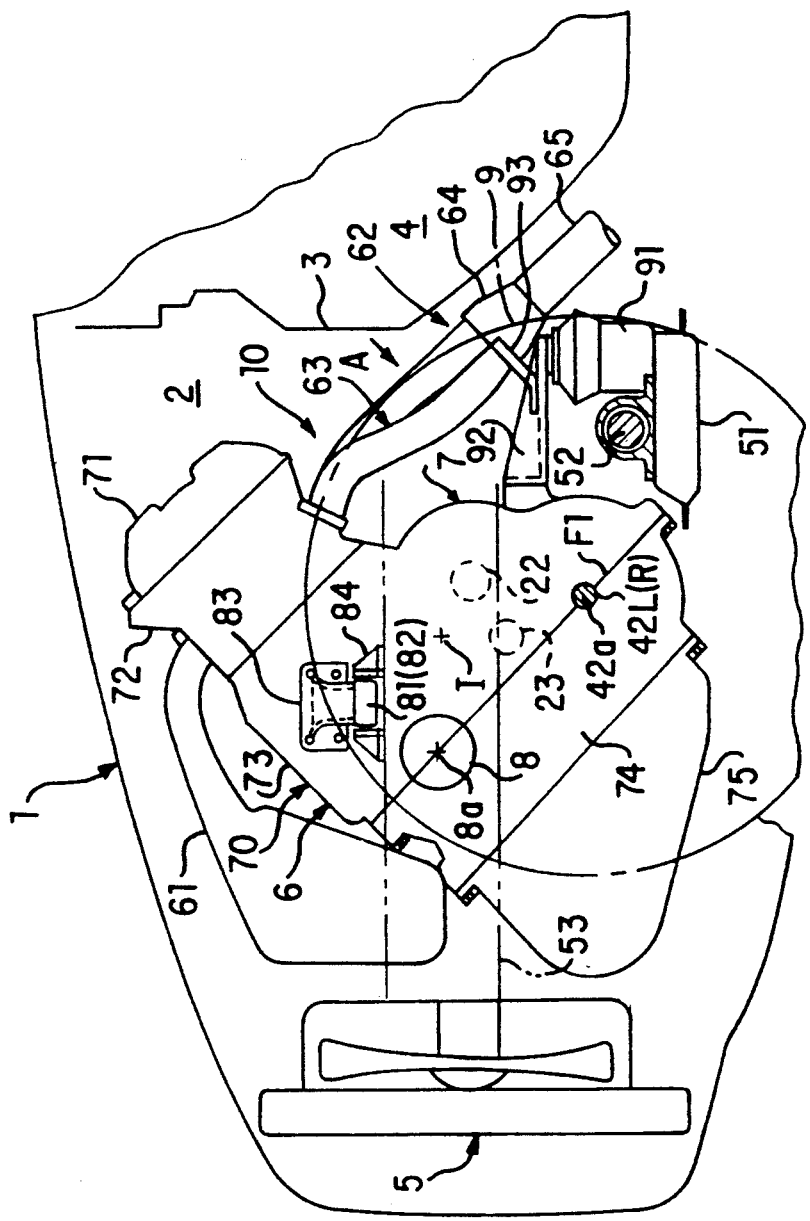
FIG. 1 is a schematic illustration showing a powertrain mounted in an engine room by a powertrain mounting structure in accordance with a preferred embodiment of the present invention.
Figure 2:
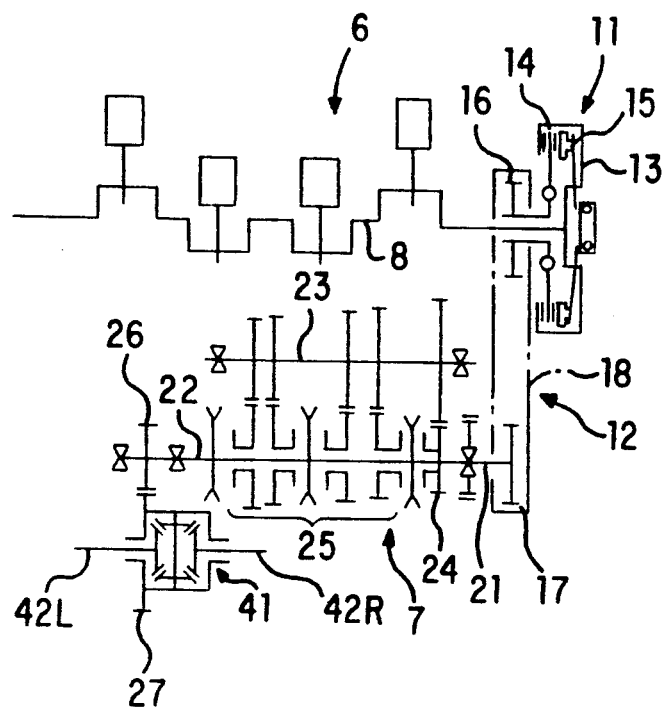
FIG. 2 is a skeleton diagram illustrating details of the powertrain of FIG. 1.

Referring to the drawings in detail and, more particularly, to FIGS. 1 and 2, a powertrain is shown as being mounted on a car body of, for instance, a front engine, front drive vehicle. The powertrain is mounted on the car body through a flexible mounting structure, according to a preferred embodiment of the present invention. An engine room 2 is formed at the front portion of a vehicle body 1 and is separated from a passenger compartment 4 by a dashboard or dash panel 3. In the engine room 2, a radiator 5, close to the front end of the engine room 2, and an engine 6 and a transmission 7, provided as a single unit and disposed behind the radiator 5, are provided. The engine 6, which is a four cylinder, reciprocating type internal combustion engine, is placed with its crankshaft 8 directed in a transverse direction of the vehicle body 1. An upper portion of the engine, such as a cylinder head, is oriented rearward, or tilted down, at about 45 degrees. The transmission 7, united with the engine 6, is placed behind the engine 6 so as to have its input and its output axes, which may be coaxial, parallel to the crankshaft 8.

The engine 6 is provided with an engine clutch 1 operationally coupled to one end of the crankshaft 8. The engine clutch 11 includes a support disc 13 fixedly secured to the crankshaft 8, a clutch disc 14 disposed adjacent to the support disc 13, and a pressure disk 15 for pressing the clutch disc 14 to the support disc 13. The engine 6 and the transmission 7 are operationally coupled to each other by a drive power transmitter 12 disposed between the engine clutch 11 and an input shaft 21 of the transmission 7. The drive power transmitter 12 includes a drive sprocket 16 fixedly secured to the clutch disc 14 of the engine clutch 11, a driven sprocket 17 fixedly secured to the input shaft 21 of the transmission 7, and a chain 18 operationally coupling the drive and driven sprockets 16 and 17. When the engine clutch 11 is locked with the support disc 13 by having the pressure disc 15 place the support disc 13 into contact with the clutch disc 14, the engine output is transmitted, via the drive power transmitter 12, to the input shaft 21 so that the input shaft 21 of the transmission 7 is rotated.

The transmission 7 has an output shaft 22 disposed coaxially with the input shaft 21, and a counter shaft 23, which is disposed parallel to the coaxial input and output shafts 21 and 22, operationally coupled to and driven by the input shaft 21 via a reduction gear train 24. Between the counter shaft 23 and the output shaft 22, there is provided a shift gear means 25 having a plurality of shift gear sets. The engine output is transmitted to the output shaft 22 from the input shaft 21 via any one of the shift gear sets of the shift gear means 25, which operationally couples the counter shaft 23 to the output shaft 22, so as to slow down the speed of rotation of the output shaft 21 or reverse the rotational direction of the output shaft 21.

The transmission 7 is provided with an output gear 26, fixedly secured to the outer end of the output shaft 22. An input gear 27 is integrally formed with, or otherwise fixedly secured to, a differential casing of a front axle differential 41 and is in mesh with the output gear 26. Consequently, the engine output is finally transmitted to the front axle differential 41 through the transmission 7. As is well known, the front axle differential 41 divides the engine output into two parts so as to drive left and right front axles 42L and 42R of front wheels 9 at same time and yet allow them to turn at different speeds when negotiating turns.

The powertrain 10, including the engine 6, the transmission 7 and the front axle differential 41, is provided in a single powertrain block unit 70 which includes, from the upper side to the lower side, a cylinder head cover 71, a cylinder head 72, an upper crankcase 73, a lower crankcase 74 and an oil pan 75. It is to be noted that almost all elements of the transmission 7 are encased within the upper crankcase 73 of the powertrain unit 70, that almost all elements of the front axle differential 4 are encased within the upper and lower crankcases 73 and 74, and that the left and right front axles 42L and 42R are partially held between the upper and lower crankcases 73 and 74. The upper and lower crankcases 73 and 74 are so formed and installed in the engine room 2 as to have an interface F1 therebetween. The interface F1 lies along a plane passing through a center axis 8a of rotation of the crankshaft 8 and center axes 42a of rotation of the left and right front axles 42L and 42R and is approximately perpendicular to longitudinal axes of cylinder bores formed in the upper crankcase 73.

In the engine room 2, a cross member 51 is disposed close to and behind the single unit powertrain block 70. In particular, the cross member 51 is located behind the front axle differential 41. The cross member 51, having a closed cross section, extends in the transverse direction between side frames 53 extending in a lengthwise direction of the vehicle body 1 so as to support a steering rack 52 at an altitude or height which is lower than, i.e., below, the rotational axis of the front axle differential 41 and of the front axes 42L and 42R. The steering rack 52, both ends of which are connected to left and right steering arms by means of tie rods (not shown), moves in the transverse direction so as to transmit steering force to the steering arms from the tie rods, thereby causing the front wheels 9 to pivot.

Figure 3:
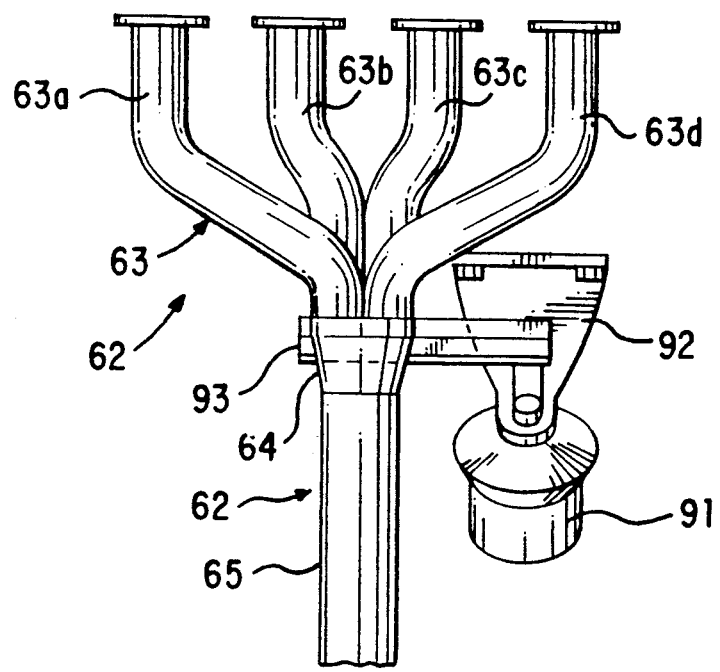
FIG. 3 is a detailed illustration of an exhaust pipe assembly as viewed in the direction of arrow A shown in FIG. 1.

An intake manifold 61 is connected to the cylinder head 72 so as to communicate with intake ports of engine cylinders of the engine 6, and an exhaust pipe assembly 62 is disposed on an opposite side of the cylinder head 72 from the intake manifold 61 so as to communicate with exhaust ports of the engine cylinders. As is shown in detail in FIG. 3, the exhaust pipe assembly 62 includes an exhaust manifold 63, having four upstream exhaust pipes connected, respectively, to the exhaust ports of the engine cylinders, and a single downstream exhaust pipe 65, connected to the exhaust manifold 63 by means of an integration pipe 64. The exhaust manifold 63 extends downward behind the transmission 7 to the downstream exhaust pipe 65 from the back side of the cylinder head 72. The downstream exhaust pipe 65 extends along approximately a lengthwise center line of the vehicle body 1, crossing over the cross member 51 near the rear end of the vehicle body 1.

The single unit powertrain block 70, which has a center axis of inertia I (referred hereafter to as a center inertial axis), extends in the transverse direction and parallel to the center rotational axis 8a of the crankshaft 8. The powertrain block 70 is mounted on the vehicle body so that the center inertial axis I is placed between the center rotational axis 8a of the crankshaft 8 and the coaxial front input and output shafts 21 and 22 of the transmission 7. For mounting the single unit powertrain block 70 in such a position, there are a pair of, or left and right, mounting means, such as trunnion mounts 81 and 82, positioned approximately right above the center inertial axis I of the single unit powertrain block 70 and secured to the side frames 53. As is shown in detail in FIG. 1A, the trunnion mount 81 includes a shaft 85 which is supported by brackets 84 and on which a sleeve 88, integrally formed with a lateral hub 86, is mounted through a rubber tube 87. The trunnion mount 82 is constructed similarly. A trunnion shaft 89 of a bracket 83 is bolted or otherwise secured to the single unit powertrain block 70 and is pivotally supported by the lateral hub 87 of the trunnion mount 81.

The single unit powertrain block 70 is further supported by a rear retainer or mount 91 secured to the cross member 51 and connected to the back of the single unit powertrain block 70. The rear retainer 91 has a bracket 92, bolted or otherwise secured thereto, beneath and behind the center inertial axis I of the single unit powertrain block 70. The single unit powertrain block 70 is flexibly or elastically supported at least partly by this bracket 92. The bracket 92 has an elastic retainer arm 93, welded or otherwise secured thereto, which extends rearwardly and up so as to support the exhaust pipe assembly 62 at the integration pipe 64.

As is apparent from the above description, because the single unit powertrain block 70, i.e., the powertrain 10, including at least the engine 6, the transmission 7 and the front differential 41, is flexibly or elastically supported at opposite sides and the back thereof by the trunnion mounts 81 and 82, positioned above the center inertial axis I, and the rear mount 91, positioned beneath and behind the center inertial axis I, the block 70 is stably and surely mounted on the vehicle body. This is true even if the block 70 is prevented from being supported on its center inertial axis due, for instance, to a close or compact layout of apparatuses which are supplemental to the engine 6. Consequently, the powertrain 10 is stably mounted on the vehicle body, and yet variations in laying out supplemental apparatuses are allowed. The cross member 51 reinforces the vehicle body near the transmission. Therefore, whenever opposed drive power or a reaction force is transmitted to the body, the body is kept suitably stiff and adequately resists the opposed drive power Furthermore, even if the vehicle body 1 is subjected to reaction forces developed on the front axles 42L and 42R and transmitted through the powertrain 10, the portion of the vehicle body at which the transmission 7 of the powertrain 10 is located is sufficiently reinforced against the reaction forces by the cross member 51. The cross member 51 extends along almost the entire width of the vehicle body and just behind the front axles 42L and 42R of the powertrain 10 and firmly holds the rear mount 91. In addition, the exhaust pipe assembly 62 is supported at points separated by only a short distance, i.e., at its upstream end by the engine 6 and at the integration pipe 64 by the elastic retainer arm 93 of the rear mount 91. Consequently, vibration of the exhaust pipe assembly is suppressed and less noise due to vibrations is produced.

Figure 4:
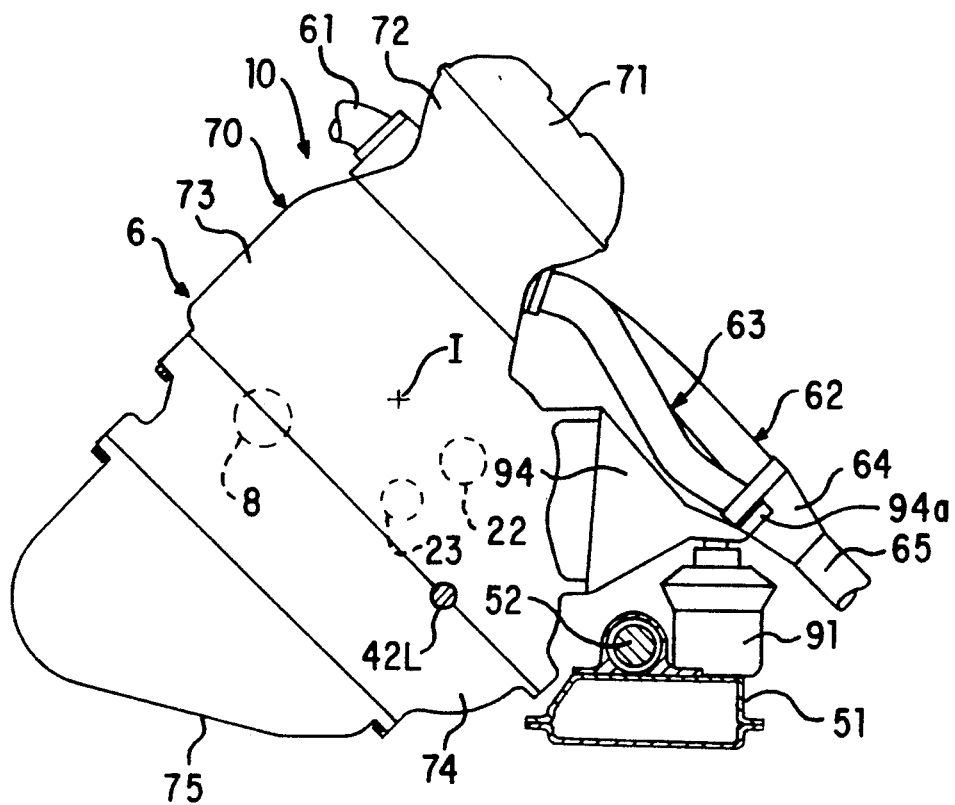
FIG. 4 is a schematic illustration showing a powertrain mounted in an engine room by a powertrain mounting structure which is similar to that of FIG. 1 but has a different retaining means.

The rear mount 91 and, in particular, the bracket 92 of the rear mount 91, may be modified or replaced, for instance, with a bracket 94 as is shown in FIG. 4

Referring to FIG. 4, the bracket 94, formed with a generally triangular section and secured to the rear mount 91, has a retainer 94a formed integrally therewith. The integration pipe 64 of the exhaust pipe assembly 62 is supported by the retainer 94a.

Figure 5:
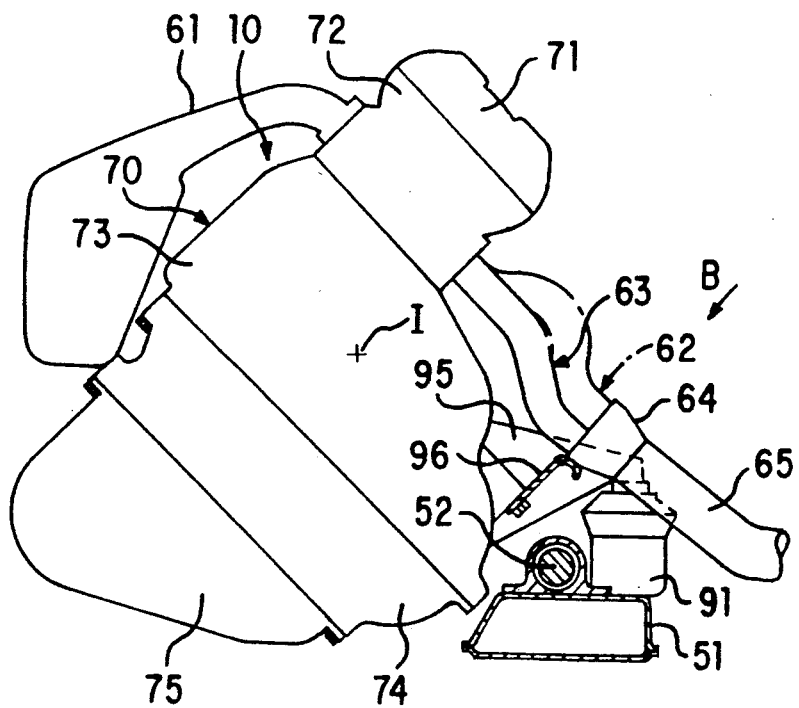
FIG. 5 is a schematic illustration showing a powertrain mounted in an engine room by a powertrain mounting structure which is similar to that of FIG. 1 but has a different retaining means.
Figure 8:
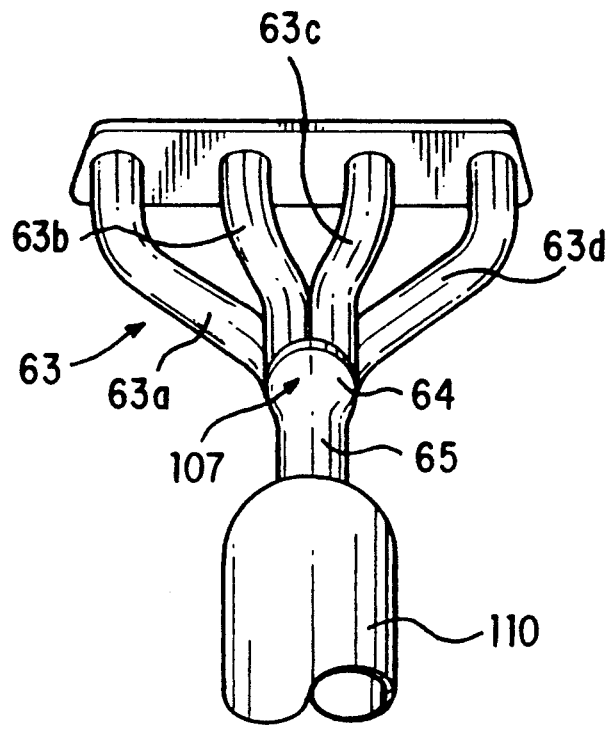
FIG. 8 is an illustration showing an exhaust manifold of the exhaust pipe assembly of FIG. 7.

Referring to FIGS. 5 and 6, another variation of the rear mount 91 is shown. In this variation, a bracket 92 and a retainer 96 are formed separately. That is, the rear mount 91 flexibly or elastically supports the single unit powertrain block 70, i.e., the powertrain 10, by means of the bracket 92 secured to the rear mount 91 and disposed on one side of the exhaust pipe assembly 62. The retainer 96 is disposed on the other side of the exhaust pipe assembly 62 and secured at its one end to the cross member 51. At its other end, the retainer 96 supports the integration pipe 64 of the exhaust pipe assembly 62.

Referring to FIGS. 7 to 11, more details of the exhaust pipe assembly 62, which is suitable for use with the powertrain 10 shown above, are shown. An exhaust manifold 63, made of steel and including four upstream exhaust pipes 63a, 63b, 63c and 63d, is connected at its upstream end to exhaust ports 6b of the engine 6 and extends obliquely downward from the engine 6. The exhaust manifold 63, i.e., all the upstream exhaust pipes 63a–63d, are connected to a downstream exhaust pipe 65 via a integration pipe 64 so as to merge exhaust gas flows passing separately through the exhaust ports 6b into a single exhaust gas flow. The downstream exhaust pipe 65, formed as one integral pipe, includes an upstream pipe portion 65a, extending obliquely downward to the underside of the vehicle body 1, and a downstream pipe portion 65b, extending horizontally towards the back of the vehicle body 1. The downstream pipe 65 is provided with a catalytic converter 110 in the horizontal downstream pipe portion 65b. The integration pipe 64 is flexibly connected to an upstream end of the downstream exhaust pipe 65 by a swivel or flexible joint 107 of a type of absorbing vibrations of the exhaust pipe assembly 62.

Figure 9:
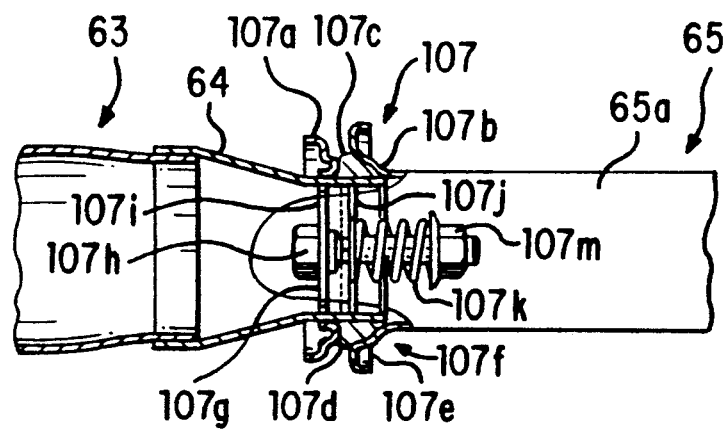
FIG. 9 is a cross-sectional view of a flexible joint disposed between an integration pipe and a downstream exhaust pipe of the exhaust pipe assembly of FIG. 7.

As is shown in detail in FIG. 9, the flexible joint 107 includes a first joint member 107a welded or otherwise secured to the integration pipe 64, and a second joint member 107b formed in an integral part of the downstream exhaust pipe 65. The first joint member 107a, which is preferably made of a carbon material, such as graphite, has a slide portion 107d with a generally convexly curved outer surface 107c. The slide portion 107d keeps in sliding contact with a tapered slide surface 107e of the second joint member 107b. Sliding contact forms an interface 107f between the first and second joint members 107a and 107b. The first and second joint members 107a and 107b are joined to each other by joint bolts 107h. Each joint bolt 107h extends so that it passes through both flanges of the first and second joint members 107a and 107b. The joint bolt 107h is, on one hand, secured to the flange 107g of the first joint member 107a by a fastening nut 107i and, on the other hand, mounts thereon a compression spring 107k between the flange 107i of the second joint member 107b and a retainer nut 107m so as to urge the second joint member 107b towards the first joint member 107a. The compression force of each compression spring 107k is adjusted by the retainer nut 107m so as to provide a desired friction between the flanges of the first and second joint members 107a and 107b. Constructing the joint 107 in this way allows the first joint member 107a to slide on the tapered surface 107e of the second joint member 107b so that the first joint member changes in position relative to the second joint member 107b. This relative positional change allows the intake manifold 63 and the downstream exhaust pipe 65 to swing relative to each other through the flexible joint 107.

Such a relative positional change between the first and second joint members 107a and 107b is restricted so that it stays within a predetermined range of angles A, less than, for instance, approximately 25.5 degrees, from and on both sides of a tangent Tm to a circular arc C. The circular arc C has its center at a point on the center inertial axis I of the single unit powertrain block 70 of the powertrain 10 and passes through a center of the flexible joint 107.

The exhaust pipe assembly 62 is further provided with a pair of joints 108 and 111, disposed before and after the catalytic convertor 110 in the downstream pipe 65. The pair of joints 108 and 111 flexibly supports the catalytic convertor 110 in the horizontal downstream pipe portion 65b. Because these joints 108 and 111 are almost the same in structure and operation as the joint 107, no description is needed.

Figures 10A, 10B:
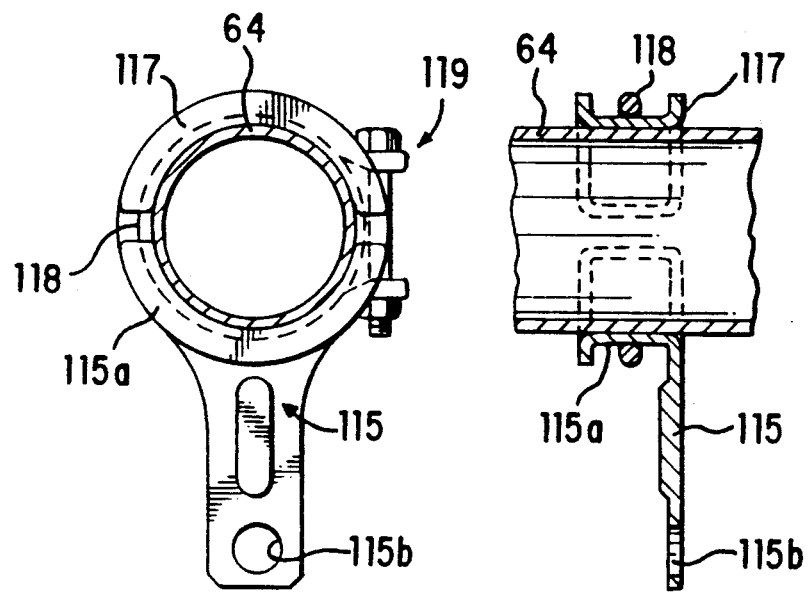
FIGS. 10A and 10B are cross-sectional views of a retaining means for supporting the exhaust pipe assembly of FIG. 7.

The exhaust pipe assembly 62 is supported by a retainer 115 fixed at one end to the integration pipe 64 and at its other end to the single unit powertrain block 70 by a bolt 106, as is shown in detail in FIGS. 10A and 10B. The retainer 115 comprises a semi-circular holder portion 115a, forming an upper half of a pipe holder, at its top and a semi-circular holder member 117, forming a lower half of the pipe holder, which forms a complete circular pipe holder. The pipe holder 115a–117 is adapted to snugly hold the integration pipe 64. The retainer 115 is formed with a lower leg portion having a hole 115b through which the bolt 116 passes to secure the retainer 115 to the single unit powertrain block 70.

When assembling the intake pipe assembly 62, the integration pipe 64 is placed on the semi-circular holder portion 115a of the retainer 115. The semi-circular holder 117 is then attached to the holder portion 115a of the retainer 115. Thereafter, the upper and lower holder portions 115a and 117 are clipped to the integration pipe by a self clamping ring or band 118. Both ends of the self clamping band 118 are coupled and fastened by a bolt-nut fastener 119 so as to allow the integration pipe 64 to slide in the pipe holder 115a-117 when it expands and shrinks due to heat variations. In such a manner, the intake pipe assembly 62 is firmly and yet flexibly supported at the integration pipe 64 by the single unit powertrain block 70 through the retainer 115.

Figure 11:
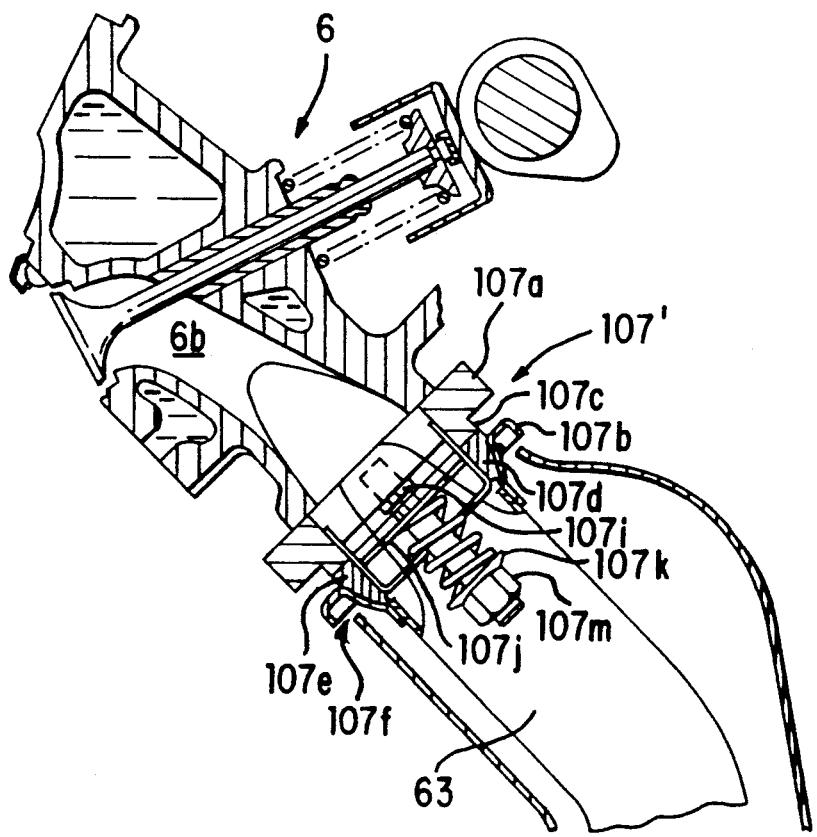
FIG. 11 is a cross-sectional view of a flexible joint disposed between the engine and each upstream exhaust pipe of the exhaust pipe assembly of FIG. 7.

Referring to FIG. 11, a flexible joint 107' is shown as being disposed between each exhaust port 6b and each upstream exhaust pipe 63. Because the flexible joint 107' is almost the same in structure and operation as the flexible joint 107, a description of the flexible joint 107' will be omitted by designating parts of the flexible joint 107' which are similar to those of the flexible joint 107 by the same reference numerals.

Figure 12:
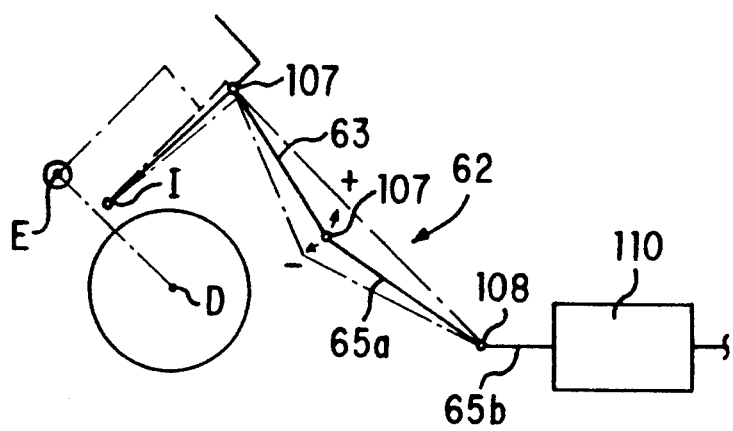
FIGS. 12, 13 and 14 are diagrams showing dynamic motion of variations of the exhaust pipe assembly of FIG. 7.

In FIG. 11, the exhaust pipe assembly 62 is not supported at the integration pipe 64 by a retainer. Rather, the exhaust pipe assembly is connected at its intake manifold 63 through the flexible joints 107'. A relative positional change between the first and second joint members 107a and 107b of the flexible joint 107 is restricted so that it remains within a range A of about 45 degrees from the tangent Tm to the circular arc C. The arc C has its center at a point which coincides with the center inertial axis I of the single unit powertrain block 70, i.e., the powertrain 10 and passes through the center of the flexible joint 107, as was previously described in conjunction with FIG. 7. Therefore when the single unit powertrain block 70 is subjected to rolling vibration about its center inertial axis I, the exhaust manifold 63 and the upstream pipe portion 65a of the downstream exhaust pipe 65 vibrate up and down, as indicated by dotted chained lines in FIG. 12.

Figure 13:
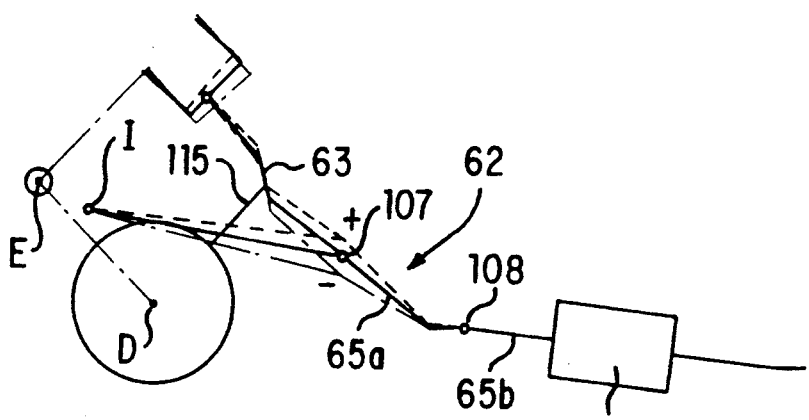

By contrast, if the exhaust pipe assembly 62 is supported at the integration pipe 64 by the retainer 115 but is not provided with any flexible joints after the catalytic convertor 110, when the single unit powertrain block 70 is subjected to rolling vibration about its center inertial axis I, the exhaust manifold 63 and the upstream pipe portion 65a of the downstream exhaust pipe 65 vibrate in the manner represented by chained and dotted chained lines in FIG. 13.

In any case, since the upstream pipe portion 65a of the downstream exhaust pipe 65 is joined at its upstream end to the integration pipe 64 by the flexible joint 107 and at its downstream end to the downstream pipe portion 65b of the downstream exhaust pipe 65 by the flexible joint 108, the horizontal downstream pipe portion 65b of the downstream exhaust pipe 65 is prevented from vibrating more effectively than it would be in conventional arrangements, in which two flexible joints are provided within a horizontal exhaust pipe. The catalytic convertor 110 is, therefore, also effectively prevented from vibrating.

Figure 14:
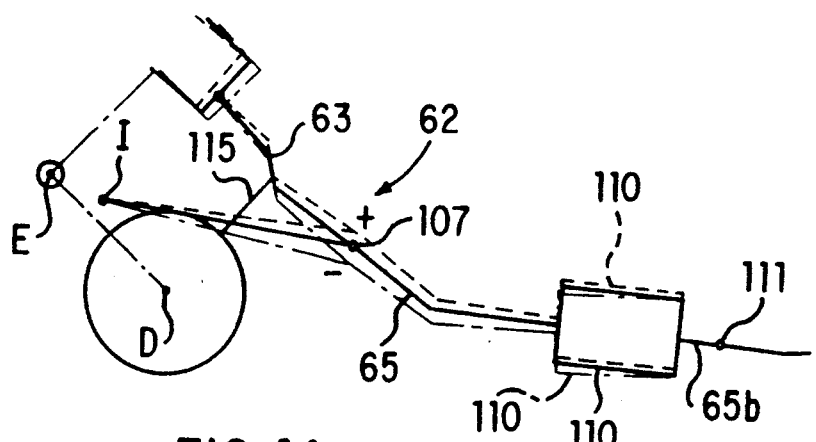

If the exhaust pipe assembly 62 is not provided with any flexible joints in its downstream exhaust pipe 65 before the catalytic convertor 110 but is supported by the retainer 115 at the integration pipe 64, as is shown in FIG. 14, the exhaust pipe assembly 62 will vibrate up and down as a single unit, as is represented by chained and dotted chained lines in FIG. 14. In this case, because one of the flexible joints 107 and 111, and specifically, the flexible joint 111, is disposed after the catalytic convertor 111 in the horizontal exhaust pipe portion 65b of the downstream exhaust pipe 65, although both the horizontal exhaust pipe portion 65b of the downstream exhaust pipe 65 and the catalytic convertor 110 vibrate to some extent, the other flexible joint, i.e., the flexible joint 107, provided in the upstream pipe portion 65a of the downstream exhaust pipe 65, effectively reduces vibrations of the horizontal exhaust pipe portion 65b of the downstream exhaust pipe 65 and the catalytic convertor 110. Reference characters E and D, shown in FIGS. 12, 13 and 14, indicate, respectively, a transverse center line of inertial rolling movement of the engine itself and a transverse center line of inertial rolling movement of the combination of the transmission and differential.

It is to be understood that although preferred embodiments of the present invention have been described in detail, various other embodiments and variants may occur to those skilled in the art which fall within the spirit and scope of the invention Any such other embodiments and variants are intended to be covered by the following claims.

What is claimed is:

1. A powertrain mounting structure for mounting a powertrain on a vehicle body, said powertrain including at least an engine and a transmission constructed as one unit and having a front and back, said engine being transversely placed with its crankshaft oriented in a transverse direction of the vehicle body and provided with an exhaust pipe assembly extending initially rearwardly and down therefrom and then under the vehicle body toward a rear end of the vehicle body, the transmission being oriented in said transverse direction and placed adjacent to and behind said engine with its input and output shafts oriented parallel to said crankshaft, said powertrain mounting structure comprising:

mounting means for flexibly mounting said powertrain on said vehicle body, said mounting means fixedly supported by said vehicle body so as to flexibly support said powertrain laterally in a line extending in said transverse direction not lower than a center axis of inertia of said one unit parallel to a center axis of rotation of said crankshaft;

retainer means fixed to said vehicle body for flexibly supporting said powertrain from its back and a portion of said exhaust pipe assembly extending rearwardly and down from its underside; and a cross member, on which said retainer means is fixed, extending in said transverse direction behind said powertrain and fixed to said vehicle body.

2. A powertrain mounting structure as recited in claim 1, wherein said cross member further supports thereon a steering rack extending in said transverse direction.

3. A powertrain mounting structure according to claim 1, wherein said powertrain comprises a single unified casing in which said engine and said transmission are accommodated as one unit.

4. A powertrain mounting structure as recited in claim 3, wherein said mounting means comprises a pair of side frames disposed on opposite sides of the vehicle body and extending in a lengthwise direction of the vehicle body and a pair of trunnion mounts fixed to said pair of side frames and transversely opposite sides of said single unified casing.

5. A powertrain mounting structure according to claim 1, wherein said engine is tilted at a predetermined angle toward a rear end of said vehicle body.

6. A powertrain mounting structure as recited in claim 1, wherein said exhaust pipe assembly comprises an upstream exhaust pipe extending rearwardly and down from said engine and a downstream exhaust pipe extending initially rearwardly and down from said upstream exhaust pipe and then under said vehicle body towards the rear end of the vehicle body, and flexible joint means for connecting the upstream and downstream exhaust pipes so as to allow relative movement between said upstream exhaust pipe and said downstream exhaust pipe within a range of 45 degrees with respect to a tangent to a circle having its center coinciding with said center axis of inertia and passing through a center of said flexible joint means.

7. A powertrain mounting structure for mounting a powertrain on a vehicle body, said powertrain including at least an engine and a transmission constructed as one unit and having a front and back, said engine being transversely placed with its crankshaft oriented in a transverse direction of the vehicle body and provided with an exhaust pipe assembly extending initially rearwardly and down therefrom and then under the vehicle body toward a rear end of the vehicle body, the transmission being oriented in transverse direction and placed adjacent to and behind said engine with its input and output shafts oriented parallel to said crankshaft, said powertrain mounting structure comprising:

- mounting means for flexibly mounting said powertrain on said vehicle body, said mounting means fixedly supported by said vehicle body so as to flexibly support said powertrain laterally in a line extending in said transverse direction not lower than a center axis of inertia of said one unit parallel to a center axis of rotation of said crankshaft;
- retainer means fixed to said vehicle body for flexibly supporting said powertrain from its back;
- supporting means fixed to said powertrain for flexibly supporting said exhaust pipe assembly from its underside; and
- a cross member, on which said retainer means is fixed, extending in said transverse direction behind said powertrain and fixed to said vehicle body.

8. A powertrain mounting structure as recited in claim 7, wherein said cross member further supports thereon a steering rack extending in said transverse direction.

9. A powertrain mounting structure according to claim 7, wherein said powertrain comprises a single unified casing in which said engine and said transmission are accommodated as one unit.

10. A powertrain mounting structure as recited in claim 9, wherein said mounting means comprises a pair of side frames disposed on opposite sides of the vehicle body and extending in a lengthwise direction of the vehicle body and a pair of trunnion mounts fixed to said pair of side frames and transversely opposite sides of said single unified casing.

11. A powertrain mounting structure according to claim 7, wherein said engine is tilted, at a predetermined angle toward a rear end of said vehicle body.

12. A powertrain mounting structure as recited in claim 7, wherein said exhaust pipe assembly comprises an upstream exhaust pipe extending rearwardly and down from said engine and a downstream exhaust pipe extending initially rearwardly and down from said upstream exhaust pipe and then under said vehicle body towards the rear end of the vehicle body, and said powertrain mounting structure further comprises flexible joint means for flexibly joining each said upstream exhaust pipe to the engine.

13. A powertrain mounting structure as recited in claim 12, and further comprising a catalytic convertor, disposed in a horizontal portion of said downstream exhaust pipe, and flexible joint means, disposed in said horizontal portion of said downstream exhaust pipe at least before said catalytic convertor, for flexibly connecting said catalytic convertor to said horizontal portion of said downstream exhaust pipe.

14. A powertrain mounting structure as recited in claim 7, said exhaust pipe assembly comprises an upstream exhaust pipe extending rearwardly and down from said engine and a downstream exhaust pipe extending initially rearwardly and down from said upstream exhaust pipe and then under said vehicle body towards the rear end of the vehicle body, and flexible joint means for connecting the upstream and downstream exhaust pipes so as to allow relative movement between said upstream exhaust pipe and said downstream exhaust pipe within a range of 45 degrees with respect to a tangent to a circle having its center coinciding with said center axis of inertia and passing through a center of said flexible joint member.

15. A powertrain mounting structure for mounting a powertrain on a vehicle body, said powertrain including at least an engine and a transmission constructed as one unit and having a front and back, said engine being transversely placed with its crankshaft oriented in a transverse direction of the vehicle body and provided with an exhaust pipe assembly extending initially rearwardly and down therefrom and then under the vehicle body toward a rear end of the vehicle body, said powertrain mounting structure comprising:

- a cross member extending in said transverse direction behind said powertrain and fixed to said vehicle body;
- mounting means for flexibly mounting said powertrain on said vehicle body, said mounting means fixedly supported by said vehicle body so as to flexibly support said powertrain laterally in a line extending in said transverse direction not lower than a center axis of inertia of said one unit parallel to a center axis of rotation of said crankshaft; and
- a pipe holder for holding said exhaust pipe assembly disposed on said cross member.

16. A powertrain mounting structure for mounting a powertrain on a vehicle body, said powertrain including at least an engine and a transmission constructed as one unit and having a front and back, said engine being transversely placed with its crankshaft oriented in a transverse direction of the vehicle body and provided with an exhaust pipe assembly extending initially rearwardly and down therefrom and then under the vehicle body toward a rear end of the vehicle body, the transmission being oriented in said transverse direction and placed adjacent to and behind said engine with its input and output shafts oriented parallel to said crankshaft, said powertrain mounting structure comprising:

- a cross member extending in said transverse direction behind said powertrain and fixed to said vehicle body;
- front engine mounting means for flexibly mounting said powertrain on said vehicle body, said mounting means fixedly supported by said vehicle body so as to flexibly support said powertrain laterally in a line extending in said transverse direction above a center axis of inertia of said one unit parallel to a center axis of rotation of said crankshaft; and
- rear engine mounting means, supported on said cross member below said center of inertia, for flexibly supporting said powertrain from its back.

* * * * *